(12) United States Patent
Audier et al.

(10) Patent No.: US 8,107,057 B2
(45) Date of Patent: Jan. 31, 2012

(54) PASSIVE IMAGING SYSTEM EQUIPPED WITH A RANGE FINDER

(75) Inventors: Marcel-Francis Audier, Paris (FR); Eric Belhaire, Cachan (FR)

(73) Assignee: Thales, Neuilly sur Seine (FR)

( * ) Notice: Subject to any disclaimer, the term of this patent is extended or adjusted under 35 U.S.C. 154(b) by 105 days.

(21) Appl. No.: 12/641,061

(22) Filed: Dec. 17, 2009

(65) Prior Publication Data
US 2010/0214554 A1 Aug. 26, 2010

(30) Foreign Application Priority Data
Dec. 23, 2008 (FR) .................................. 08 07397

(51) Int. Cl.
*G01C 3/08* (2006.01)
(52) U.S. Cl. ..................... 356/5.01; 356/3.01; 356/4.01; 356/5.1; 356/5.15
(58) Field of Classification Search ......... 356/3.01–28.5
See application file for complete search history.

(56) References Cited

U.S. PATENT DOCUMENTS

| | | | |
|---|---|---|---|
| 5,812,190 A | 9/1998 | Audier et al. | |
| 5,998,777 A | 12/1999 | Audier et al. | |
| 6,091,126 A | 7/2000 | Costard et al. | |
| 6,452,666 B1 | 9/2002 | Barna et al. | |
| 6,534,758 B2 | 3/2003 | Costard et al. | |
| 6,627,868 B2 | 9/2003 | Bois et al. | |
| 6,797,938 B2 | 9/2004 | Bois et al. | |
| 6,829,043 B2 * | 12/2004 | Lewis et al. | 356/5.06 |
| 2004/0150810 A1 * | 8/2004 | Muenter et al. | 356/5.01 |

FOREIGN PATENT DOCUMENTS

| | | |
|---|---|---|
| EP | 1860462 | 11/2007 |
| FR | 2735935 | 12/1996 |
| FR | 2915833 | 11/2008 |
| WO | WO 99/34235 | 7/1999 |

OTHER PUBLICATIONS

U.S. Appl. No. 09/058,967.
U.S. Appl. No. 12/598,754, Marcel-Francis Audier.

* cited by examiner

*Primary Examiner* — Thomas Tarcza
*Assistant Examiner* — Luke Ratcliffe
(74) *Attorney, Agent, or Firm* — LaRiviere, Grubman & Payne, LLP

(57) ABSTRACT

The invention relates to a range finding method for a target by means of a pulsed laser (4) and a device for detecting pulses backscattered by the target, which comprises a step for emitting pulses with a repetition frequency f. The detection device comprises an array of photodiodes (21) associated with integrators (22'). The method comprises steps for roughly then finely locating the target, the rough locating step comprising the following substeps:

integration of a backscattered pulse, over a time window of duration F and offset by an offset Off between the instant of emission of the pulse and that of the start of said integration, with Off<$1/f$ and F<$1/f$, as long as the signal is less than a first threshold, the integration steps are reiterated with a new offset Off incremented by approximately F relative to the preceding offset Off, on completion of these iterations, the target being roughly located within a distance range corresponding to the time window of duration F and offset by the offset Off designated $Off_g$, the fine locating step is implemented, which comprises the following sub steps:

integration of a backscattered pulse over a time window of duration F' and offset by an offset $Off_f$ equal to $Off_g$, the integration steps are reiterated with a new offset $Off_f$ of the time window incremented by an offset d relative to the preceding offset $\text{Off}_f$, with $d<F'$ and $\text{Off}_g \leqq \text{Off}_f \leqq \text{Off}_g + F$ according to the detected signal.

8 Claims, 3 Drawing Sheets

PASSIVE IMAGING SYSTEM EQUIPPED WITH A RANGE FINDER

This application claims priority to French Patent Application Number 08 07397, entitled, Systeme D'Imagerie Passive Equipe D'un Telemetre, filed Dec. 23, 2008.

The field of the invention is that of laser range finding by flight time measurement, associated with passive imaging in a wide observation field.

A range finding device for a target is often associated with a passive imaging system in a multifunction optronics system.

Figure 1:
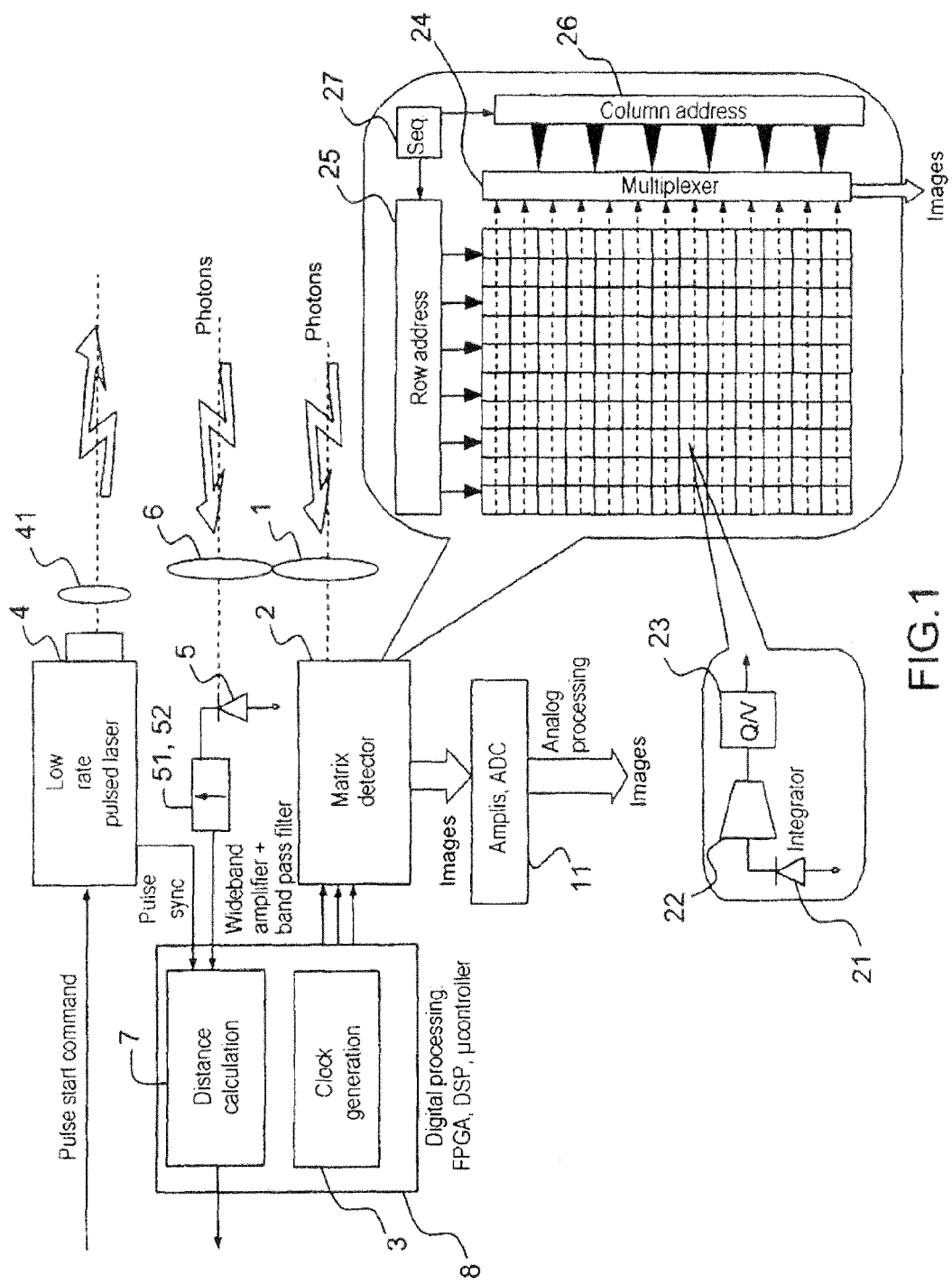

An example of such a multifunctional optronics system is described in relation to FIG. 1.

It comprises, for the passive imaging part, an optical configuration for forming images on an array detector 2 located in the focal plane of this configuration. The figure shows the front optic 1 of this configuration. The array detector 2 comprises an array of transducers 21 such as photodiodes which convert the photons received into electrons in proportion to the received lighting; these electrical charges are then integrated by the integrators 22 respectively associated with the transducers, and proportionally converted into voltage by a charge-voltage converter 23. The detector also comprises a row addressing circuit 25, a column addressing circuit 26 and a multiplexer 24 that multiplexes all the signals obtained from the converters 23 and generates an output video signal containing the luminescence information from the array detector (designated images in the figure) that is amplified and converted by amplifiers and analogue-digital converters 11 so it can be subsequently processed. The row addressing circuit 25 selects the row that is connected to the multiplexer. The column addressing circuit 26 generates the control signals for the multiplexer 24. The read circuit also comprises, in certain cases, a read sequencing circuit 27 which generates the control address sequence for the addressing circuits in order to ensure that the image is completely read. The integrators, the read sequencer, the addressing circuits and the multiplexer are elements of the read circuit of the array detector. The integrators 22 are controlled by a control signal emitted by a clock generator 3. In certain cases, the read sequencer 27 makes it possible to generate the addresses corresponding to a small subarray of photodiodes to limit the reading to a single area of interest. The integration start and end signals, the commands for the read sequencer or even, directly, the inputs of the addressing circuits are generated by the clock generator 3.

It comprises, for the range finding part:
- a pulsed laser 4 formatted by an optic 41, illuminating the target and from which the signal is partly backscattered to a range finding detector 5,
- an optic 6 with large pupil area to maximize the amplitude of the received signal,
- the range finding detector 5, generally produced with an avalanche diode of silicon or InGaAs, or even CdHgTe (depending on the wavelength of the laser used) of high bandwidth and with a multiplication factor high enough to enable very weak signals to be detected; a wide band amplifier 51 and a band pass filter 52 are linked to the photodiode,
- a module 7 for calculating distance based on the detected signal and the time elapsed between the start of the laser pulse (designated pulse sync in the figure) and the detection of said signal.

The clock generator 3 and the distance calculation module 7 are housed in a digital processing unit 8.

The reception field is greater than the coverage of the illuminated target surface area, to take account of the harmonization defects between the lines of sight of the emitter 4 and of the detector 2.

Among the main drawbacks and constraints limiting the range of these range finding devices based on flight time measurement, the following are worthy of mention:
- the reception field greater than the real useful field which generates a photonic noise due to the scene background degrading the wanted signal/noise ratio and, consequently, the range,
- the avalanche detectors which exhibit relatively high noise figures (typically 5 for InGaAs and Si),
- the laser pulses delivering high energies per pulse which are slow, bulky and costly.

An additional drawback can be added to this list: the surface area of the reception optic 6 is often limited by the sharing of available surface area with the other optics dedicated to the passive imaging functions (visible and thermal, laser spot detection to produce the angle error measurement, etc.).

Consequently, there still remains a need for an optronic system handling range finding and passive imaging functions that simultaneously give satisfaction to all the abovementioned requirements, in terms of SNR, range finding range, reduced bulk and cost, reaction time.

More specifically, the subject of the invention is a range finding method for a target by means of a pulsed laser and a device for detecting pulses backscattered by the target, which comprises a step for emitting laser pulses at determined instants and with a repetition frequency f. It is mainly characterized in that the detection device including an array detector which comprises an array of photodiodes associated with integrators, the method comprises the following steps of roughly locating then finely locating the target. The rough locating step comprises the following substeps:
- integration by the integrators of a backscattered pulse, received by the photodiodes over a time window of predetermined duration F and offset by an offset Off between the instant of emission of the pulse and that of the start of said integration, with Off<1/f and F<1/f,
- comparison of said integrated signal with a first predefined threshold,
- as long as the signal is less than this threshold, the integration and comparison steps are reiterated with a new offset Off of the time window incremented by approximately F relative to the preceding offset Off,
- on completion of these iterations, the target being roughly located within a distance range corresponding to the time window of duration F and offset by the offset Off designated $Off_g$, the fine locating step is implemented.

It comprises the following substeps:
- integration by the integrators of a backscattered pulse received by the photodiodes over a time window of predetermined duration F' and offset by an offset $Off_f$ equal to $Off_g$,
- comparison of said integrated signal with a second predefined threshold,
- the integration and comparison steps are reiterated with a new offset $Off_f$ of the time window incremented by an offset d relative to the preceding offset $Off_f$, with d<F' and $Off_g \leq Off_f \leq Off_g + F$, until the signal exceeds this second threshold if the signal is less than this threshold on the first iteration, or until the signal passes below this threshold if the signal is greater than this threshold on the first iteration, the target being located on completion of these iterations.

F and Off are, for example, determined according to a distance range within which the target is likely to be located.

Similarly, d is determined according to the required location accuracy.

It preferably comprises a substep for post-integration of the received signals before the comparison substep.

The thresholds are, for example, determined according to a target estimated minimum signal.

Another subject of the invention is an imaging optronic system which comprises an array detector and a digital processing unit for the images obtained from the detector, characterized in that it comprises a device for emitting laser pulses and in that the processing unit comprises means for implementing the method as described.

The array detector advantageously comprises an array of photodiodes associated with integrators and is equipped with array row and column addressing circuits.

This system makes it possible:
- to use a single detection assembly (optics and detector) for the combined range finding and imaging functions,
- to avoid the use of a wide bandwidth electronic amplification subsystem generating a very low noise for the range finding channel,
- to correctly operate the range finding in conditions of strong backscatter from the atmosphere close to the holder of the system,
- to use, for range finding functions, less costly lasers of reduced bulk, delivering pulse trains of low energy but high frequency,
- to combine high performance passive imaging and range finding functions through one and the same optic and a single detection block.

Figure 2A:
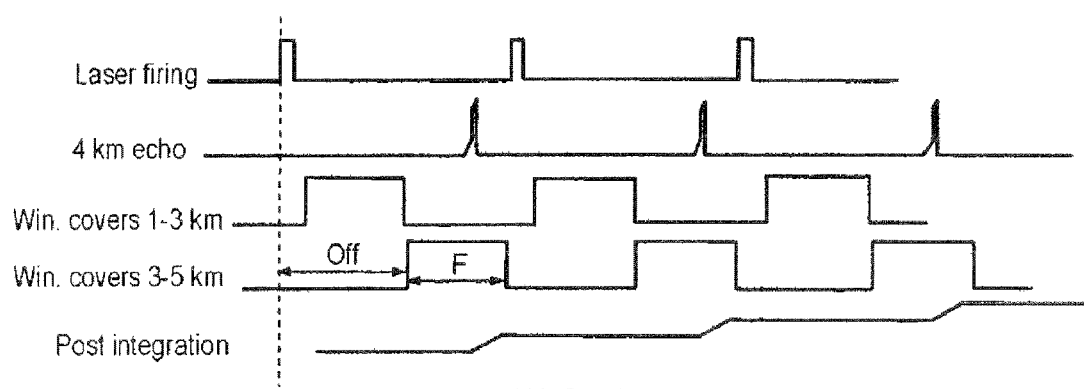
Figure 2B:
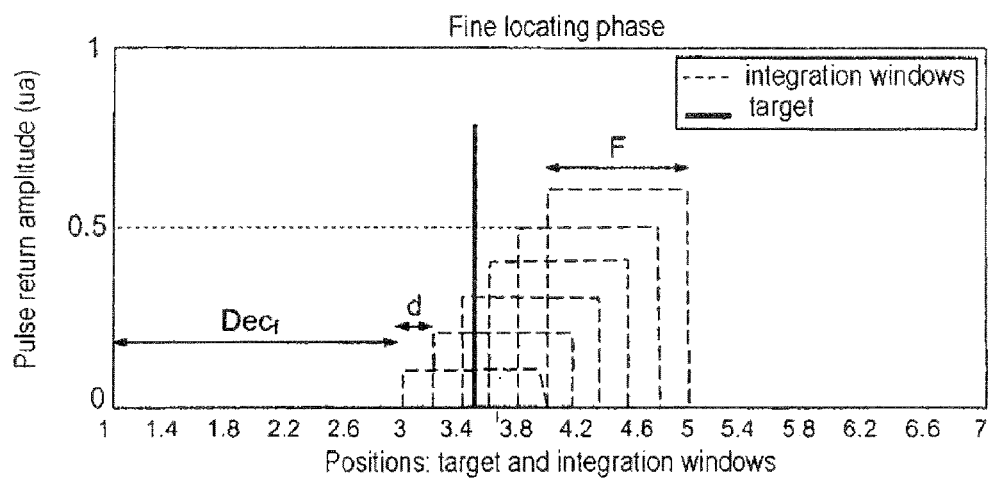
Figure 4:
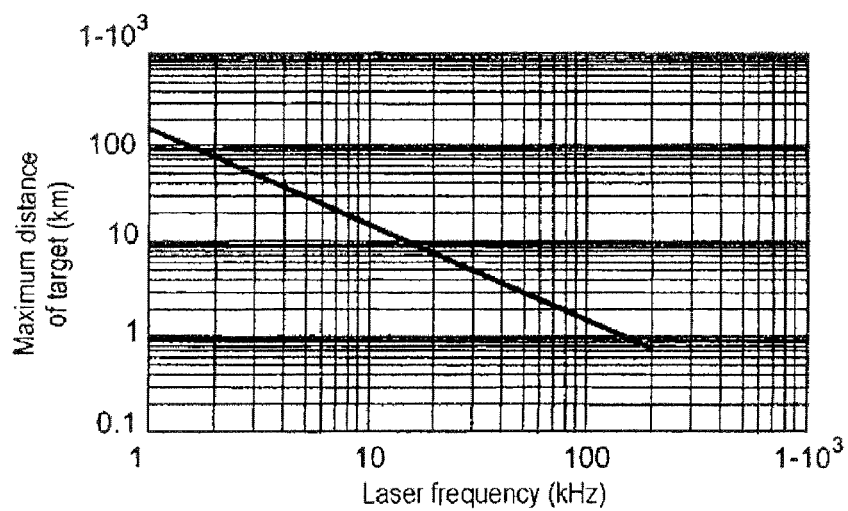
Figure 3:
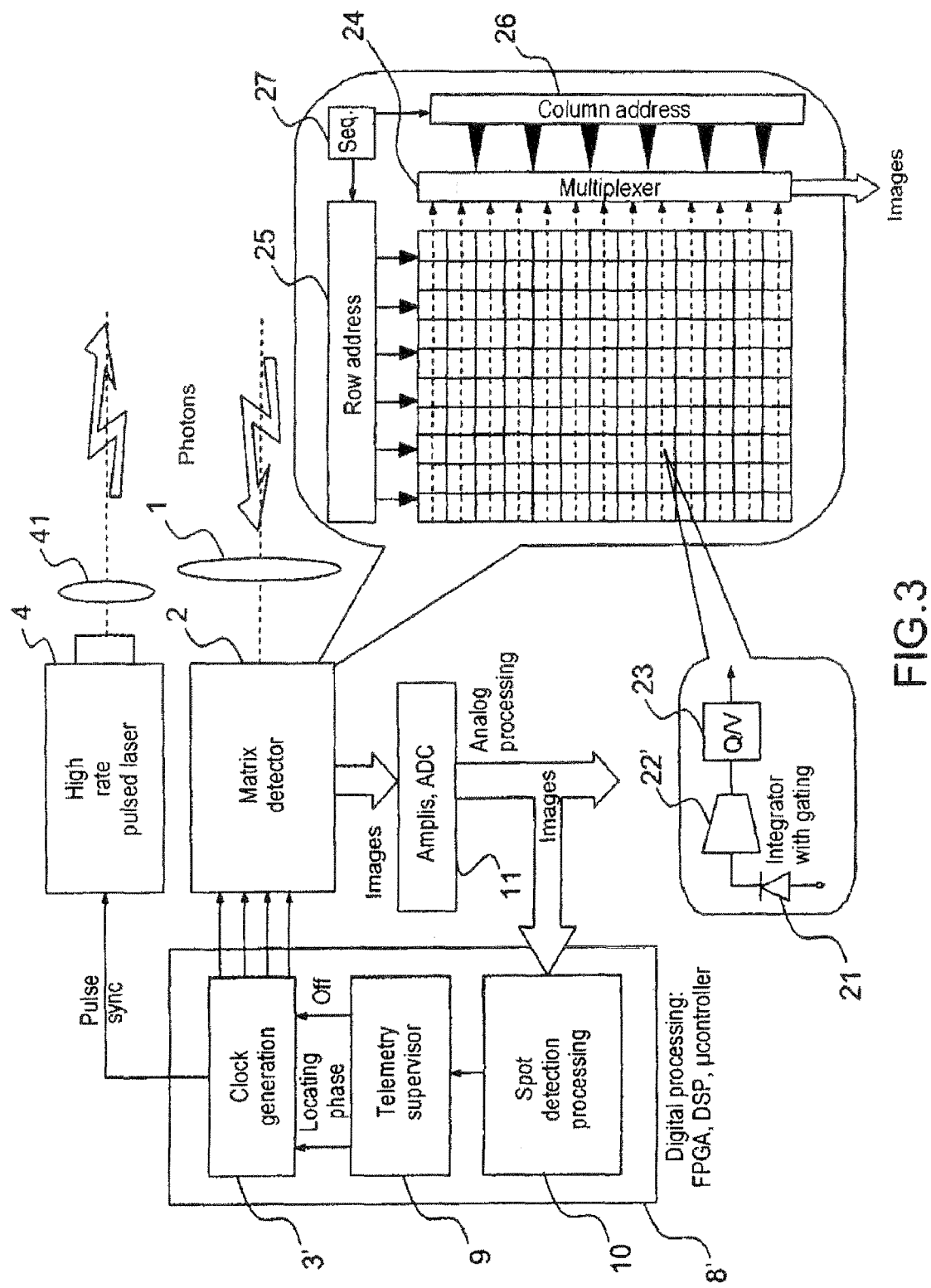

Other features and advantages of the invention will become apparent from reading the following detailed description, given by way of nonlimiting example and with reference to the appended drawings in which:

FIG. 1, already described, diagrammatically represents a multifunction optronic system according to the state of the art; a first zoom on the array detector is used to show the array of photodiodes and the read circuit and a second zoom on an element of this array is used to show a photodiode and its associated integrator and converter, FIG. 2 diagrammatically illustrate the rough locating phase for the target (FIG. 2a) and the fine locating phase (FIG. 2b), FIG. 3 diagrammatically represents a multifunction optronic system according to the invention, FIG. 4 represents the maximum range finding distance according to the laser repetition frequency.

According to the invention, the array detector of the imaging system is also used for range finding purposes. The distance calculation is no longer obtained from the measurement of the time elapsed between the departure of a pulse and the return of the corresponding backscattered signal, but according to the following method.

FIGS. 2a and 2b illustrate different steps of the range finding method according to the invention. The latter is based on a first phase of roughly but rapidly locating the position of a target, followed by a finer locating phase.

The phase for roughly locating the target comprises the following steps:
- Emission of laser pulses with a width of the order of 10 ns for example, at instants determined by the system. The repetition frequency f is less than a limit frequency so as to avoid the appearance of overlaps between the pulses emitted and received. This limit frequency is therefore calculated according to the maximum range finding range illustrated in FIG. 4. It is typically greater than 20 kHz which corresponds to a range of 10 km.
- Integration into time windows of the determined dimension F, at a frequency equal to that of the emission frequency; the following applies: $F<1/f$. A number of integration windows are preferably opened in synchronism with the arrival of the backscattered laser pulses, the latter being post-integrated in the read circuit. The dimension of the time window F is determined by the corresponding distance range designated Dis within which the target could be located; furthermore, this distance range is positioned from an origin distance O determined by the offset Off between the instant of emission of the pulse and that of the start of integration; the following applies: $Off<1/f$. Finally, an integration window of determined duration F and offset Off has a corresponding departure position O of a distance range Dis. For example, an integration window of 13.4 μs covers a distance range of 2 km and an offset of 20 μs corresponds to a departure position located at 3 km: thus, this integration window covers a distance of between 3 and 5 km. Depending on the position of the echo, the latter coincides or does not coincide with this distance range. If the target is located within this range, at 4 km for example, the echo is integrated and therefore detected, that is to say that the target is roughly located between 3 and 5 km; it is in fact post-integrated in the course of the integration windows as illustrated in the figure. However, if it is situated outside, for example at 6 km, it is not detected.
- If the echo is not detected, that is to say if it is less than a predetermined threshold, the process is reiterated but the integration window is offset by F (new Off=preceding Off+F) to cover the next range whose departure position O is then located at 5 km, that is to say to cover the distance Dis between 5 and 7 km. To be sure that there will be no discontinuity with the next range, a slight overlap is provided between two consecutive windows: the window is preferably offset by F-δF, with, for example, δF being of the order of approximately 1% of F. The process continues until the target is roughly located.

Once this rough locating is completed, the fine locating phase is implemented. Now knowing the distance range and its position O, the next phase aims to specify the position of the target within this range.

The term "rough" window is used to designate the window resulting from the rough locating step and offset by an offset designated $Off_g$. During the fine locating step, the time window is offset within this "rough" time window by successive offsets $Off_f$. These successive offsets $Off_f$ are such that:

new $Off_f$=preceding $Off_f$+d.

Its duration F' is equal to F or is possibly less, on the one hand so as not to integrate photons that originate from an unanalyzed portion of the scene, on the other hand to optimize the overall range finding duration. The position of the target is determined by these successive offsets. In practice, the echo appears (that is, when it is greater than a predetermined threshold), over a limited number of windows and disappears immediately when the delay d is greater than the pulsed flight time, that is to say, as and when these windows are offset within the "rough" window. The following applies:

$Off_g \leq Off_f \leq Off_g + F$.

The locating accuracy is determined by these offsets d: the knowledge of the distance is acquired with the accuracy defined by the increment of the delay d, or 1.5 m per 10 ns.

A time window F of 6.68 µs has a corresponding range of 1 km, and an offset d of 1.33 µs has a corresponding advance of 200 m over the terrain; in this example, 5 offsets are sufficient to cover a range of 1 km with an accuracy of 200 m.

In the example of FIG. 2, the result of the rough phase is that the target is located between 3 and 5 km and a time window of duration F of 6.67 µs corresponding to a range of 1 km, and time offsets of 1.33 µs corresponding to distance offsets of 200 m have been chosen. Since the target is located at 3.5 km, its echo appears and is detected over the first 3 windows then disappears from the 4th window: the target is therefore situated between 3.4 and 3.6 km.

According to the invention, the imaging device and the range finding device have a common detection assembly. The range finding detector 5, the associated amplifier and filter 51, 52 and the associated optic 6 described in the preamble become unnecessary; the distance calculation module 7, as described in the preamble, is replaced by a module for implementing the iterative method described previously, housed by the digital processing unit 8'. This common detection assembly provides a gain in sensitivity by maximization of the size of the optic 1.

To be able to handle a range finding function as described previously, the image processing unit 8' further comprises conventional imaging means described in the preamble, a spot detection processing module 10 which receives the detected images in order, by comparison with a given threshold, to determine the presence or absence of a laser signal backscattered by a target (echo) and range finding supervision means 9. The range finding supervision means 9 indicate to the clock generator 3' the rough or fine locating phase as well as the offset Off or $Off_f$ to be applied. The clock generator 3' emits range finding-specific control signals in addition to imaging-specific control signals. These specific signals are: pulse departure signal intended for the laser 4, signal indicating connection or disconnection of a photodiode 21 to or from its integrator 22' in order to perform the post-integration and produce a "gating" function.

Also for the range finding purposes, the array detector 2 according to the invention has the following characteristics:
 the array of photodiodes (256 rows×320 columns for example) is produced on a semiconductor material whose spectral mask is adapted to passive imaging and to the wavelengths of the laser illumination. Such materials can, for example, include:
  silicon adapted to detect a laser beam that has a wavelength of between 0.4 µm and 1.1 µm,
  CdHgTe adapted to detect a laser beam that has a wavelength of between 0.4 µm and 15 µm,
  InGaAs adapted to detect a laser beam that has a wavelength of between 0.4 µm and 2.5 µm,
 the integration capacity of each integrator of the read circuit is dimensioned size-wise for the constraints of the passive imaging and each integrator 22' has, for the range finding, the necessary resources (transistor arrangements) to open integration time windows that are very short (some 10 ns to some 10 µs) in order to handle a "gating" function and post-integrate the received signals;
 furthermore, this same read circuit allows for:
  accurate control of the delay (or offset) Off or $Off_f$ between the emission of the laser pulse and the start of the integration of the corresponding backscattered signal, via digital control signals emitted by the clock generator 3;
  post-integration over a number of integration windows of several backscattered pulses thanks to the disconnection/reconnection of the photodiode 21 from and to the integrator 22', controlled via digital control signals emitted by the clock generator 3'; this offers the possibility of using lasers 4 of low pulse power and operating at high frequencies;
 preferably, a windowing that is random in size and position of the detection array through the intermediary of a selective addressing of the rows and columns of the array, which offers the possibility of selecting, in active mode, a small subarray of photodiodes. This makes it possible to limit the reading to a single area of interest by increasing the repetition frequency of the laser pulses up to very high frequencies, for example greater than 20 kHz. The use of a detection array, capable of conventional passive imaging, divides the total observation field into a large number of small individual fields, equal to the number of transducers in the array. For a given observation field, if this individual field is very small, the photonic noise generated becomes almost negligible thus making it possible to detect signals of very low amplitudes, compatible with a function for detecting a remote laser spot. The operation of a small portion of the array (a few tens of pixels) allows frames of reduced sizes to be read quickly (in 50 µs to 100 µs). This small portion of the array nevertheless has a size greater than that of a conventional range finder photodiode: the result of this is a strong reduction in the harmonization constraints between the range finder's emission and reception channels.

By reading just the small area of interest of the array (for example: 32 columns×10 rows), the distance information can be acquired in a few ms.

This spatial windowing offers the following advantages:
 a sensitivity gain in laser spot and range finding detection by minimization of the background photonic noise,
 simplification of the observance of the standards concerning ocular safety,
 a sensitivity gain by reduction of the bandwidth, and therefore of the noise, of the associated electronics.

The invention claimed is:

1. Range finding method for a target by means of a pulsed laser and a detection device that detects pulses backscattered by the target, comprising:
 a. Calculating a first location using emitting laser pulses at determined instants and with a repetition frequency f, characterized in that the detection device includes an array detector which comprises an array of photodiodes associated with integrators by:
  i. calculating a first integrated signal through integration by the integrators of a backscattered pulse, received by the photodiodes over a time window of predetermined duration F and offset by an offset Off between the instant of emission of the pulse and that of the start of said integration, with Off<1/f and F<1/f,
  ii. comparing the first integrated signal with a first predefined threshold, as long as the signal is less than this threshold, the calculating through integration and comparison steps are reiterated with a new offset Off of the time window incremented by approximately F relative to the preceding offset Off,
  iii. on completion of these iterations, the target being located within a distance range corresponding to the time window of duration F and offset by the offset Off designated Off.sub.g;
 b. calculating a second location, wherein the second location is a more precise location of the target than the first location, by:

i. calculating a second integrated signal through integration by the integrators of a backscattered pulse received by the photodiodes over a time window of predetermined duration F' and offset by an offset Off.sub.f equal to Off.sub.g, ii. comparing the second integrated signal with a second predefined threshold, c. repeating the preceding two steps with a new offset Off.sub.f of the time window incremented by an offset d relative to the preceding offset Off.sub.f, with d<F' and Off.sub.g.ltoreq.Off.sub.f.ltoreq. Off.sub.g+F until the second integrated signal exceeds the second threshold if the second integrated signal is less than the second threshold on the first iteration, or until the second integrated signal passes below the second threshold if the second integrated signal is greater than the second threshold on the first iteration, the target being located on completion of these iterations.

2. The method of claim 1, wherein F and Off are determined according to a distance range within which the target is likely to be located.

3. The method of claim 1, wherein d is determined according to a user defined level of precision.

4. The method of claim 1, wherein F'.ltoreq.F.

5. The method of claim 1, further comprising post-integration of the pulses received before the comparison first substep.

6. The method of claim 1, wherein the first and second thresholds are determined according to a target estimated minimum signal and the number of any post-integrations.

7. An imaging optronic system comprising:
a. an array detector that obtains images; and
b. a digital processing unit for the images obtained from the array detector comprising a means for implementing the method according to one of the preceding claims; and
c. a device for emitting laser pulses.

8. The imaging optronic system according to claim 7, wherein the array detector comprises:
a. an array of photodiodes associated with integrators; and
b. is equipped with array row and column addressing circuits.

* * * * *